US012610401B2

(12) United States Patent
Liu et al.

(10) Patent No.: US 12,610,401 B2
(45) Date of Patent: Apr. 21, 2026

(54) SYSTEMS AND METHODS FOR CALCULATING AND CONFIGURING RANDOM ACCESS CHANNEL

(71) Applicant: ZTE CORPORATION, Shenzhen (CN)

(72) Inventors: Juan Liu, Shenzhen (CN); Ziyang Li, Shenzhen (CN); Li Tian, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 325 days.

(21) Appl. No.: 18/520,158

(22) Filed: Nov. 27, 2023

(65) Prior Publication Data

US 2024/0188144 A1     Jun. 6, 2024

Related U.S. Application Data

(63) Continuation of application No. PCT/CN2021/111084, filed on Aug. 6, 2021.

(51) Int. Cl.
*H04W 74/0833* (2024.01)
*H04L 27/26* (2006.01)

(52) U.S. Cl.
CPC ... *H04W 74/0833* (2013.01); *H04L 27/26025* (2021.01)

(58) Field of Classification Search
CPC ......... H04W 74/0833; H04L 27/26025; H04L 27/2602
See application file for complete search history.

(56) References Cited

U.S. PATENT DOCUMENTS

| | | | |
|---|---|---|---|
| 11,013,036 B2 | 5/2021 | Li et al. | |
| 2021/0227578 A1* | 7/2021 | Jiang | H04W 74/006 |
| 2022/0191936 A1 | 6/2022 | Shin et al. | |
| 2022/0369385 A1* | 11/2022 | Sakhnini | H04W 72/046 |
| 2023/0037998 A1* | 2/2023 | Lin | H04W 74/006 |
| 2024/0306208 A1* | 9/2024 | Shin | H04W 72/04 |

FOREIGN PATENT DOCUMENTS

| | | |
|---|---|---|
| CN | 110291835 A | 9/2019 |
| CN | 112584507 A | 3/2021 |
| WO | WO-2020/197351 A1 | 10/2020 |

OTHER PUBLICATIONS

Extended European Search Report for EP Appl. No. 21952374.3, dated Jul. 23, 2024 (13 pages).
Intel Corporation, "Discussion on initial access aspects for extending NR up to 71 GHz", 3GPP TSG RAN WG1 Meeting #105-e, R1-2104894, May 27, 2021, e-Meeting (18 pages).

(Continued)

*Primary Examiner* — Michael K Phillips
(74) *Attorney, Agent, or Firm* — Foley & Lardner LLP

(57) ABSTRACT

Presented are systems and methods for calculating and configuring a random access channel (RACH). A wireless communication device may determine whether a gap is to be present between a pair of adjacent random access channel (RACH) occasions (ROs), for a subcarrier spacing (SCS) of a physical RACH (PRACH) slot that is higher than 120 kiloHertz (KHz) or 60 KHz. The wireless communication device may determine a length of the gap, if the gap is to be present.

18 Claims, 9 Drawing Sheets

650

(56) References Cited

OTHER PUBLICATIONS

International Search Report and Written Opinion for PCT Appl. No. PCT/CN2021/111084, mailed Apr. 25, 2022 (8 pages).

Moderator (Intel Corporation), "Issue Summary for initial access aspects of NR extension up to 71 GHz" 3GPP TSG RAN WG1 Meeting #104-bis-e, R1-2103801, Apr. 20, 2021, e-Meeting (22 pages).

Qualcomm Incorporated, "Initial access aspects for NR to support operation between 52.6 GHz and 71 GHz" 3GPP TSG RAN WG1 #105-e, R1-2104659, May 27, 2021, e-Meeting (21 pages).

* cited by examiner

540

PRACH Slot N + 1

PRACH Slot N $n_t^{RA}=2$ $n_t^{RA}=1$ $n_t^{RA}=0$ $N_{dur}^{RA}$    gap    $N_{dur}^{RA}$    gap    $N_{dur}^{RA}$

652 Determine whether a gap is to be present between a pair of ROs

654 Determine a length of the gap

SYSTEMS AND METHODS FOR CALCULATING AND CONFIGURING RANDOM ACCESS CHANNEL

CROSS-REFERENCE TO RELATED APPLICATION

This application claims the benefit of priority under 35 U.S.C. § 120 as a continuation of International Patent Application No. PCT/CN2021/111084, filed on Aug. 6, 2021, the disclosure of which is incorporated herein by reference in its entirety.

TECHNICAL FIELD

The disclosure relates generally to wireless communications, including but not limited to systems and methods for calculating and configuring a random access channel (RACH).

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may determine whether a gap is to be present between a pair of adjacent random access channel (RACH) occasions (ROs), for a subcarrier spacing (SCS) of a physical RACH (PRACH) slot that is higher than 120 kiloHertz (KHz) or 60 KHz. The wireless communication device may determine a length of the gap, if the gap is to be present.

In some embodiments, the wireless communication device may determine that the gap is to be present, according to a RO duration of a corresponding RACH format. In some embodiments, the wireless communication device may determine that the gap is to be present, responsive to the RO duration being smaller than, or smaller than or equal to, a threshold. In some embodiments, the wireless communication device may determine that the gap is to be present, according to a number of ROs in the PRACH slot. In some embodiments, the wireless communication device may determine that the gap is to be present, responsive to the number of ROs being greater than, or greater than or equal to, a threshold. In certain embodiments, the wireless communication device may determine that the gap is absent, responsive to the number of ROs being smaller than the threshold.

In some embodiments, the length of the gap may include or correspond to one symbol or a number of consecutive symbols. In some embodiments, the wireless communication device may determine the length of the gap according to the SCS. In certain embodiments, the wireless communication device may determine the length of the gap as a value predefined for the SCS or mapped to the SCS. In certain embodiments, the wireless communication device may determine the length of the gap according to a frequency range of a PRACH preamble transmission or a system configuration. In some embodiments, the wireless communication device may determine the length of the gap as a value predefined for the frequency range or mapped to the frequency range. In some embodiments, the length of the gap may be a predefined or configured value.

In some embodiments, the wireless communication device may determine the length of the gap according to an indication in a signaling, or independent of any signaling. In certain embodiments, the signaling may comprise downlink control information (DCI) signaling or radio resource control (RRC) signaling. In some embodiments, the DCI signaling may correspond to DCI 1_0 or DCI 0_0 format, or the indication may comprise at least one RRC parameter including at least one of: RACH-ConfigCommon, RACH-ConfigDedicated or RACH-ConfigGeneric. In some embodiments, the wireless communication device may determine the length of the gap such that a starting position of a RO is in a next PRACH slot, to avoid the RO straddling across the PRACH slot and the next PRACH slot.

At least one aspect is directed to a system, method, apparatus, or a computer-readable medium. A wireless communication node (e.g., a ground terminal, a base station, a gNB, an eNB, or a serving node) may transmit a signaling to a wireless communication device. Transmitting the signaling may cause the wireless communication device to determine whether a gap is to be present between a pair of adjacent random access channel (RACH) occasions (ROs), for a subcarrier spacing (SCS) of a physical RACH (PRACH) slot that is higher than 120 kiloHertz (KHz) or 60 KHz; and if the gap is to be present, to determine a length of the gap.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIGS. 5A-5D illustrate example configurations for one or more PRACH slots with one or more gaps, in accordance with some embodiments of the present disclosure.

DETAILED DESCRIPTION

1. Mobile Communication Technology and Environment

Figure 1:
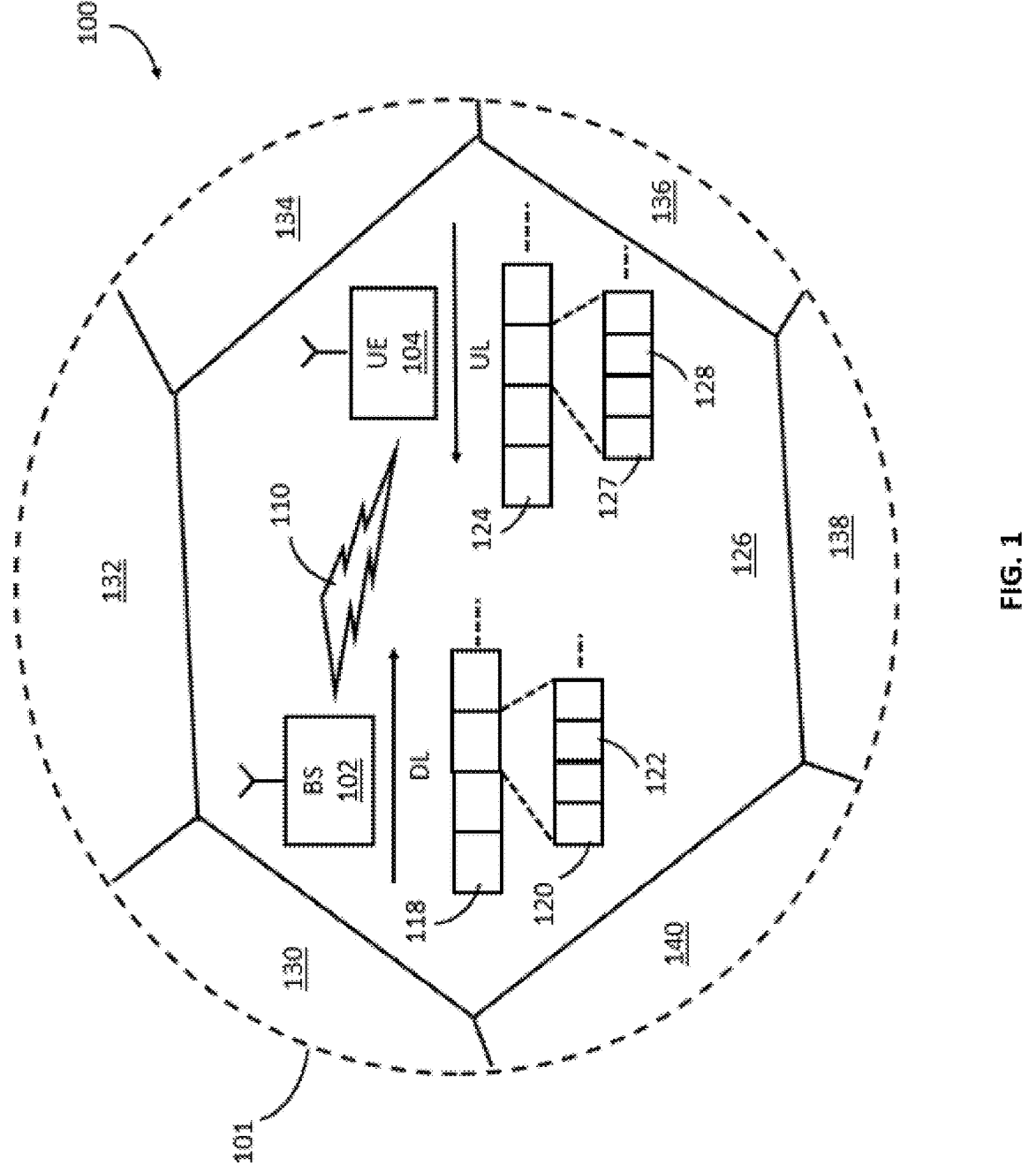
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
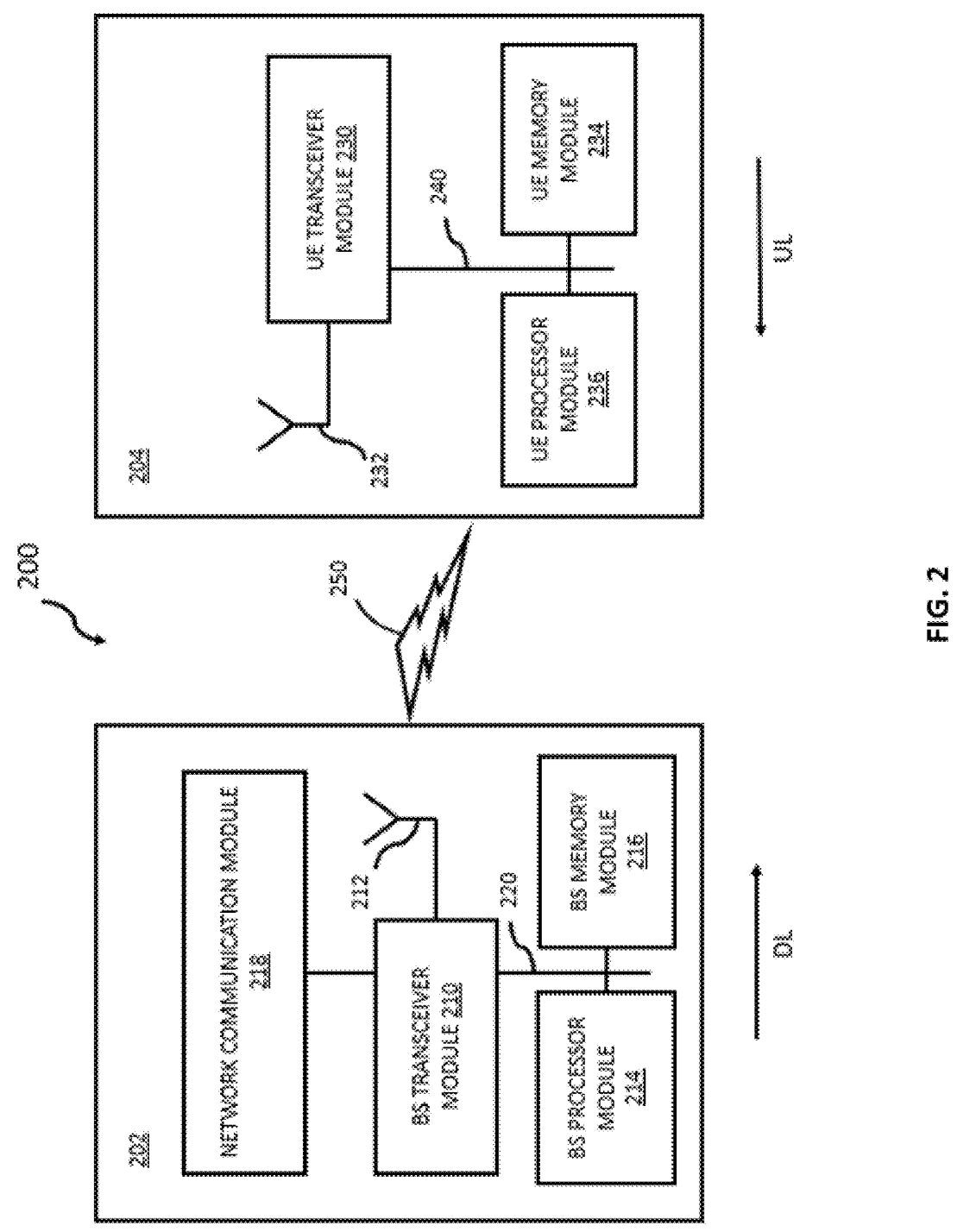
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Calculating and Configuring a Random Access Channel

In certain systems with high carrier frequencies (e.g., 5G new radio (NR), Next Generation (NG) systems, 3GPP systems, and/or other systems), a channel bandwidth of said systems may increase (e.g., be wider). For instance, a channel bandwidth of a 5G NR system may be larger than a channel bandwidth of a Long Term Evolution (LTE) system (e.g., a 5G NR system can include/use higher carrier frequencies compared to a LTE system). Systems with higher carrier frequencies may use, include, and/or introduce a new/distinct subcarrier spacing (SCS). In addition, said systems (e.g., systems with higher carrier frequencies) may use, include, and/or introduce a gap (e.g., a time-instance/domain gap, such as a number of symbols). In some embodiments, one or more processes can use said gap, such as for (or to support/enable) a look before talk (LBT) process, a beam (e.g., direction) switching process, and/or a physical random access channel (PRACH) process (otherwise sometimes referred to as a random access channel (RACH) process). For instance, in a PRACH process, the gap can be inserted/introduced in between RACH occasions (RO). In certain systems with higher carrier frequencies, a higher frequency SCS can result in a slot with a shorter/smaller duration, and/or a shorter cyclic prefix (CP). As such, a gap (e.g., a LBT gap) for a beam direction switch time, for example, can be used between ROs. The systems and methods presented herein include a novel approach for configuring and/or introducing said gap between ROs.

A. Method 1

In some embodiments, a wireless communication device (e.g., a UE, a terminal, or a served node) may determine a length of a gap (e.g., a gap to be present, inserted, introduced, and/or configured between a pair of adjacent ROs). For instance, the wireless communication device can determine and/or configure the length of the gap according to (or based on) the (PRACH) SCS (e.g., SCS of 960 kHz, SCS of 480 kHz, and/or other values of a SCS). In some embodiments, the length of the gap can be determined, defined, calculated, and/or configured according to a number/quantity/amount of symbols (e.g., at a symbol level). In certain embodiments, the gap may include or correspond to a number/amount of consecutive and/or adjacent symbols.

For instance, for a SCS with a value of 960 kHz, the wireless communication device may determine that the length of the gap includes or corresponds to 1 symbol, 2 symbols, 3 symbols, 4 symbols, 5 symbols, 6 symbols, 7 symbols, 8 symbols, 9 symbols, 10 symbols, 11 symbols, 12 symbols, and/or other numbers of symbols, (e.g., M symbols). In one example, for a SCS with a value of 480 kHz, the wireless communication device may determine that the length of the gap includes or corresponds to 1 symbol, 2 symbols, 3 symbols, 4 symbols, 5 symbols, 6 symbols, 7 symbols, 8 symbols, 9 symbols, 10 symbols, 11 symbols, 12 symbols, and/or other numbers of symbols. For a SCS with a value of $15*N$ kHz (e.g., 15 kHz, 30 kHz, 60 kHz, 120 kHz, 240 kHz, and/or other frequencies that are multiples of 15) and/or $960*N$ kHz, the wireless communication device may determine that the length of the gap includes or corresponds to 1 symbol, 2 symbols, 3 symbols, 4 symbols, 5 symbols, 6 symbols, 7 symbols, 8 symbols, 9 symbols, 10 symbols, 11 symbols, 12 symbols, and/or other numbers of symbols. In some embodiments, N (and M) may indicate, include, and/or correspond to an integer value.

Figure 3:
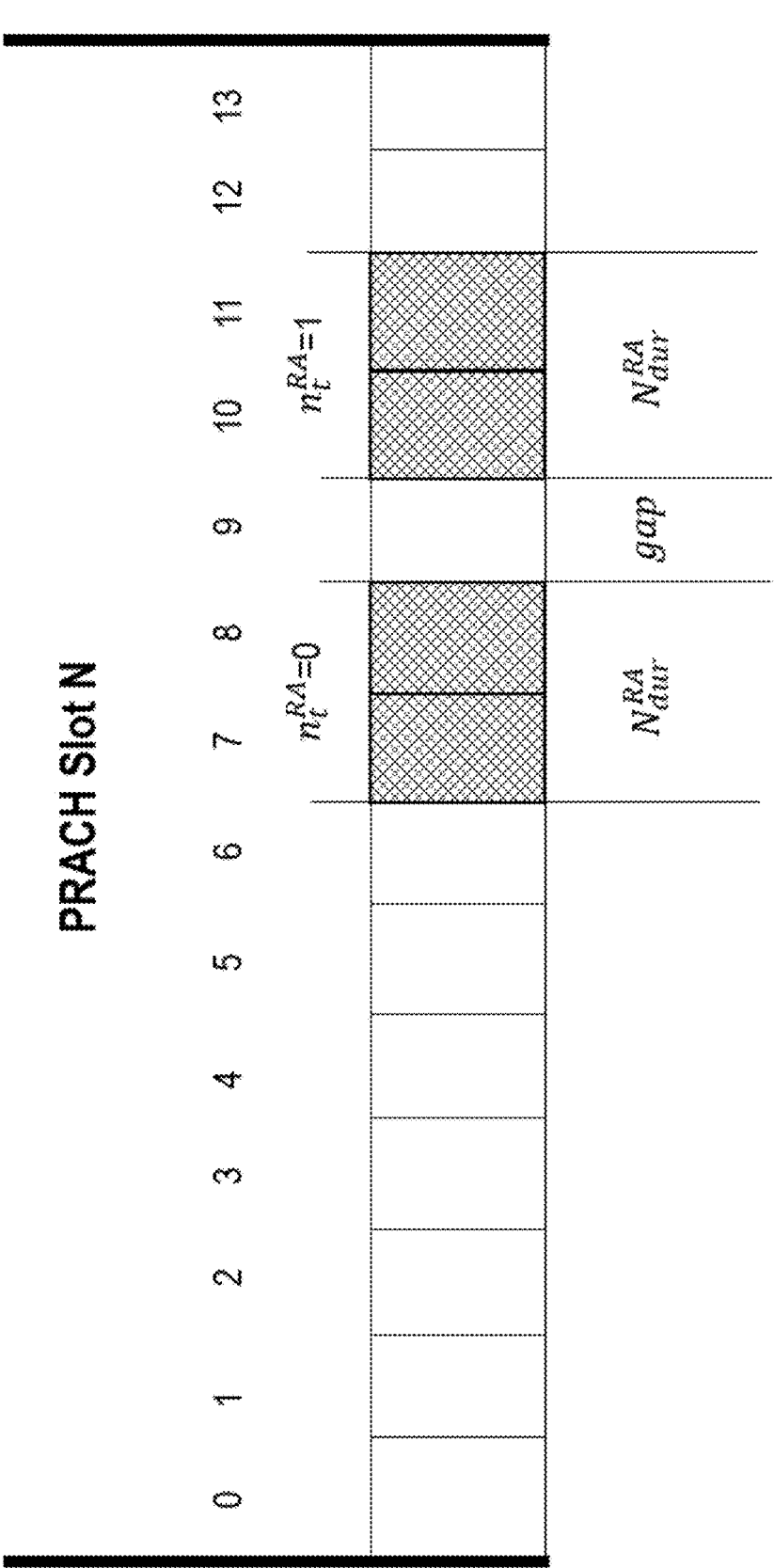
FIGS. 3-4 illustrate example configurations for a PRACH slot, in accordance with some embodiments of the present disclosure.
Figure 4:
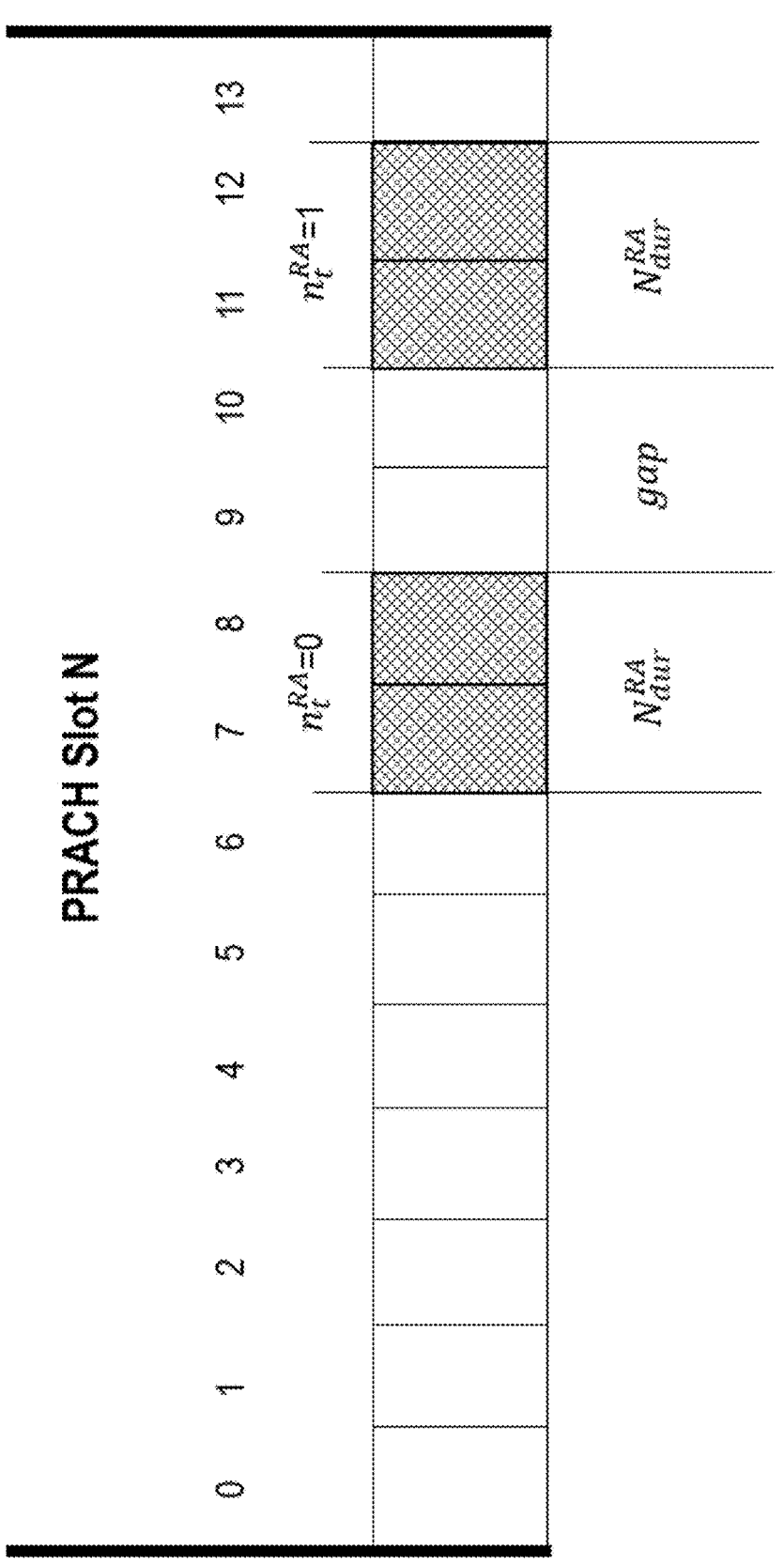

Referring now to FIGS. 3 and 4, depicted are configurations of an embodiment of a PRACH slot, according to a value of a PRACH Config. Index. As shown in FIG. 3, the length of the gap (e.g., a gap between a pair of ROs) may include or correspond to 1 symbol. As shown in FIG. 4, the length of the gap may include or correspond to 2 symbols.

B. Method 1A

In some embodiments, the wireless communication device may determine, configure, and/or calculate the length of the gap. For instance, the wireless communication device may determine the length of the gap according to (or based on) a frequency range (e.g., FR1, FR2, FR2-2 (referring to 52.6 GHz-71 GHz), and/or other frequency ranges) of a PRACH preamble transmission or a system configuration. The system may include or correspond to a LTE system, a 4G system, a 5G system, a Next Generation (NG) system, and/or other types of systems. In some embodiments, the length of the gap can be determined, defined, calculated, and/or configured according to a number/quantity/amount of symbols (e.g., at a symbol level). In certain embodiments, the gap may include or correspond to a number/amount of consecutive and/or adjacent symbols.

In one example, for a 960 kHz PRACH SCS (and/or other frequency ranges), the wireless communication device may determine that the length of the gap includes or corresponds to 1 symbol, 2 symbols, 3 symbols, 4 symbols, 5 symbols, 6 symbols, 7 symbols, 8 symbols, 9 symbols, 10 symbols, 11 symbols, 12 symbols, and/or other numbers of symbols (e.g., M symbols). In another example, for a 480 kHz PRACH SCS (and/or other frequency ranges), the wireless communication device may determine that the length of the gap includes or corresponds to 1 symbol, 2 symbols, 3 symbols, 4 symbols, 5 symbols, 6 symbols, 7 symbols, 8 symbols, 9 symbols, 10 symbols, 11 symbols, 12 symbols, and/or other numbers of symbols. For a 15 kHz, 30 kHz, 60 kHz, 120 kHz, 240 kHz, and/or $960*N$ kHz PRACH SCS, the wireless communication device may determine that the length of the gap includes or corresponds to 1 symbol, 2 symbols, 3 symbols, 4 symbols, 5 symbols, 6 symbols, 7 symbols, 8 symbols, 9 symbols, 10 symbols, 11 symbols, 12 symbols, and/or other numbers of symbols (e.g., M symbols). In some embodiments, N (and M) may indicate, include, and/or correspond to an integer value.

C. Method 2

In some embodiments, the wireless communication device may determine and/or identify whether a gap is to be present between a pair of adjacent ROs. For instance, the wireless communication device may determine that the gap is to be present according to (or based on) a RO duration of a corresponding RACH format (e.g., the gap is related to (or associated with) the RACH format). In one example, the wireless communication device may determine that the gap is to be present responsive to the RO duration being smaller than, or smaller than or equal to, a threshold. The threshold may include or correspond to an "X" number of symbols. The "X" can be an integer with values of 4, 6, 12, and/or other values. In one example, the wireless communication device may determine that the RO duration is smaller than (or equal to) 4 symbols (or other thresholds), for instance. As such, the wireless communication device may determine that the gap is to be present, introduced, and/or inserted between adjacent ROs. In certain embodiments, the gap may include or correspond to a number/amount of consecutive and/or adjacent symbols.

In one example, for a 960 kHz PRACH SCS (and/or other frequency ranges of a PRACH preamble transmission or a system configuration), the wireless communication device may determine that the length of the gap includes or corresponds to 1 symbol, 2 symbols, 3 symbols, 4 symbols, 5 symbols, 6 symbols, 7 symbols, 8 symbols, 9 symbols, 10 symbols, 11 symbols, 12 symbols, and/or other numbers of symbols (e.g., M symbols). In another example, for a 480 kHz PRACH SCS (and/or other frequency ranges), the wireless communication device may determine that the length of the gap includes or corresponds to 1 symbol, 2 symbols, 3 symbols, 4 symbols, 5 symbols, 6 symbols, 7 symbols, 8 symbols, 9 symbols, 10 symbols, 11 symbols, 12 symbols, and/or other numbers of symbols. For a $960*N$ KHz PRACH SCS, the wireless communication device may determine that the length of the gap includes or corresponds to 1 symbol, 2 symbols, 3 symbols, 4 symbols, 5 symbols, 6 symbols, 7 symbols, 8 symbols, 9 symbols, 10 symbols, 11 symbols, 12 symbols, and/or other numbers of symbols (e.g., M symbols). In some embodiments, N (and M) may indicate, include, and/or correspond to an integer value.

D. Method 3

In some embodiments, the wireless communication device may determine and/or identify whether a gap is to be present between a pair of adjacent ROs. For instance, the wireless communication device may determine that the gap is to be present according to a number of ROs in the PRACH slot (e.g., the gap is related to (or associated with) the number of ROs in a PRACH slot). In one example, the wireless communication device may determine that the gap is to be present responsive to the number of ROs being greater than, or greater than or equal to, a threshold. The threshold may include or correspond to a value "X". The "X" can be an integer with values of 2, 3, 6, 7, and/or other values. In one example, the wireless communication device may determine that the number of ROs is greater than (or equal to) 6 (or other thresholds), for instance. As such, the wireless communication device may determine that the gap is to be present, introduced, and/or inserted between adjacent ROs. In certain embodiments, the gap may include or correspond to a number/amount of consecutive and/or adjacent symbols.

E. Method 3A

In some embodiments, the wireless communication device may determine and/or identify whether a gap is to be absent between a pair of adjacent ROs. For instance, the wireless communication device may determine that the gap is to be absent (e.g., not needed) according to a number of ROs in the PRACH slot (e.g., the absence of the gap is related to (or associated with) the number of ROs in a PRACH slot). In one example, the wireless communication device may determine that the gap is to be absent responsive to the number of ROs being smaller than a threshold. The threshold may include or correspond to a value "X". The "X" can be an integer with values of 1, 2, and/or other values. In one example, the wireless communication device may determine that the number of ROs is smaller than 2 (or other thresholds), for instance. As such, the wireless communication device may determine that the gap is to be absent. In certain embodiments, the gap may include or correspond to a number/amount of consecutive and/or adjacent symbols.

F. Method 4

In some embodiments, the wireless communication device may determine, configure, and/or calculate the length of the gap. For instance, the wireless communication device may determine the length of the gap is a predefined, predetermined, and/or configured value. A configuration of a wireless system, for example, can determine/configure the predefined value. In some embodiments, the length of the gap can be determined, defined, calculated, and/or configured according to a number/quantity/amount of symbols (e.g., at a symbol level). In certain embodiments, the gap may include or correspond to a number/amount of consecutive and/or adjacent symbols. In some embodiments, the predefined, predetermined, and/or configured value of the length of the gap can be 1 symbol, 2 symbols, 3 symbols, 4 symbols, 5 symbols, 6 symbols, 7 symbols, 8 symbols, 9 symbols, 10 symbols, 11 symbols, 12 symbols, and/or other numbers of symbols, such as M symbols. The M can indicate, include, and/or correspond to an integer value.

G. Method 5

In some embodiments, the wireless communication device may determine the length of the gap according to an indication in a signaling, or independent of any signaling. For instance, the wireless communication device may determine the length of the gap in any of Methods 1-4 according to an indication in a signaling, or independent of any signaling. The signaling can include downlink control information (DCI) signaling, radio resource control (RRC) signaling, and/or other types of signaling. The DCI signaling can correspond to a DCI 1_0 format, a DCI 0_0 format, and/or other types of DCI formats. The indication in the signaling may comprises at least one RRC parameter. The RRC parameter(s) can include at least one of: RACH-ConfigCommon, RACH-ConfigDedicated, RACH-ConfigGeneric, and/or other RRC parameters.

H. Method 6

Figure 5A:
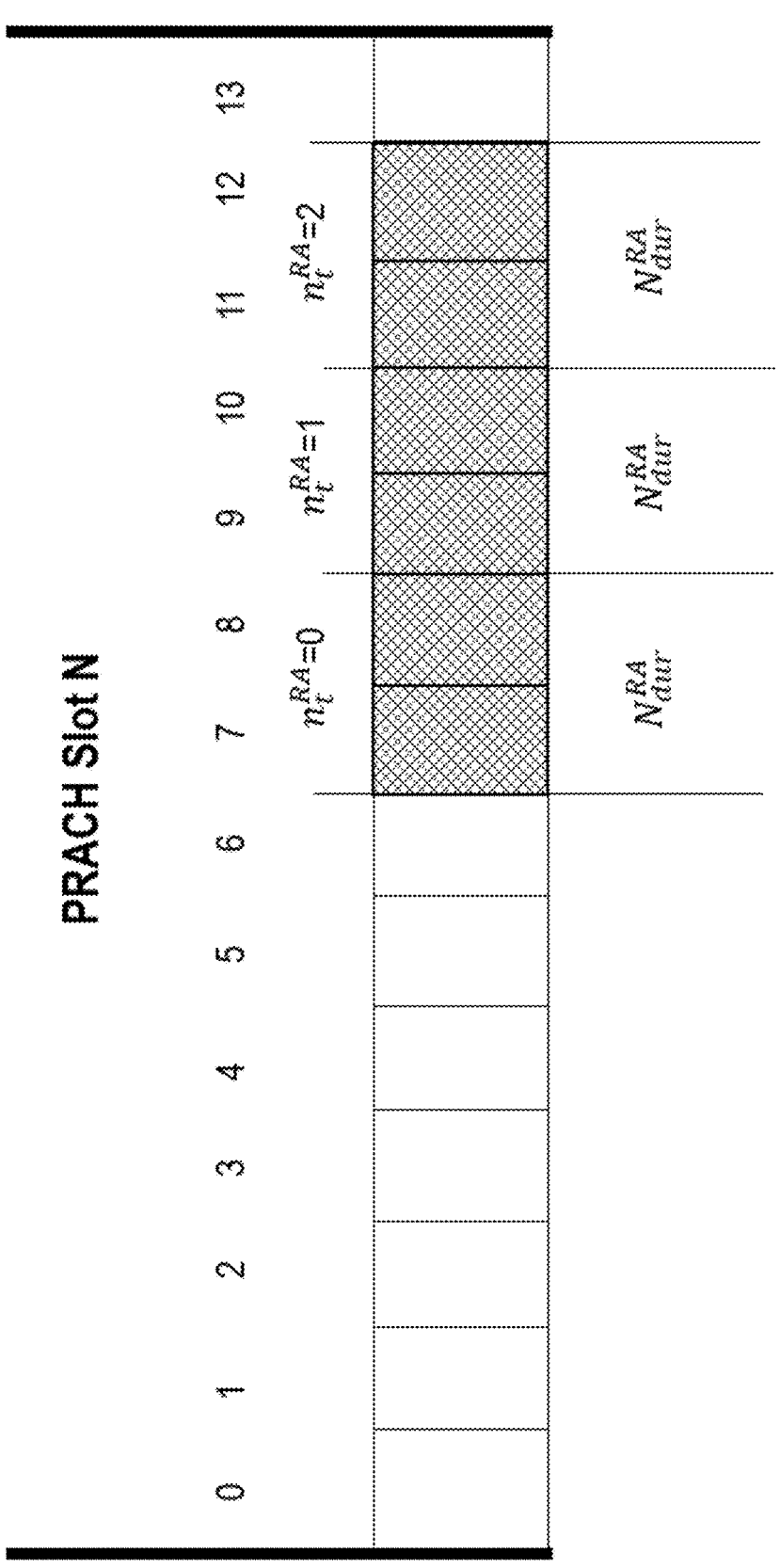
Figure 5B:
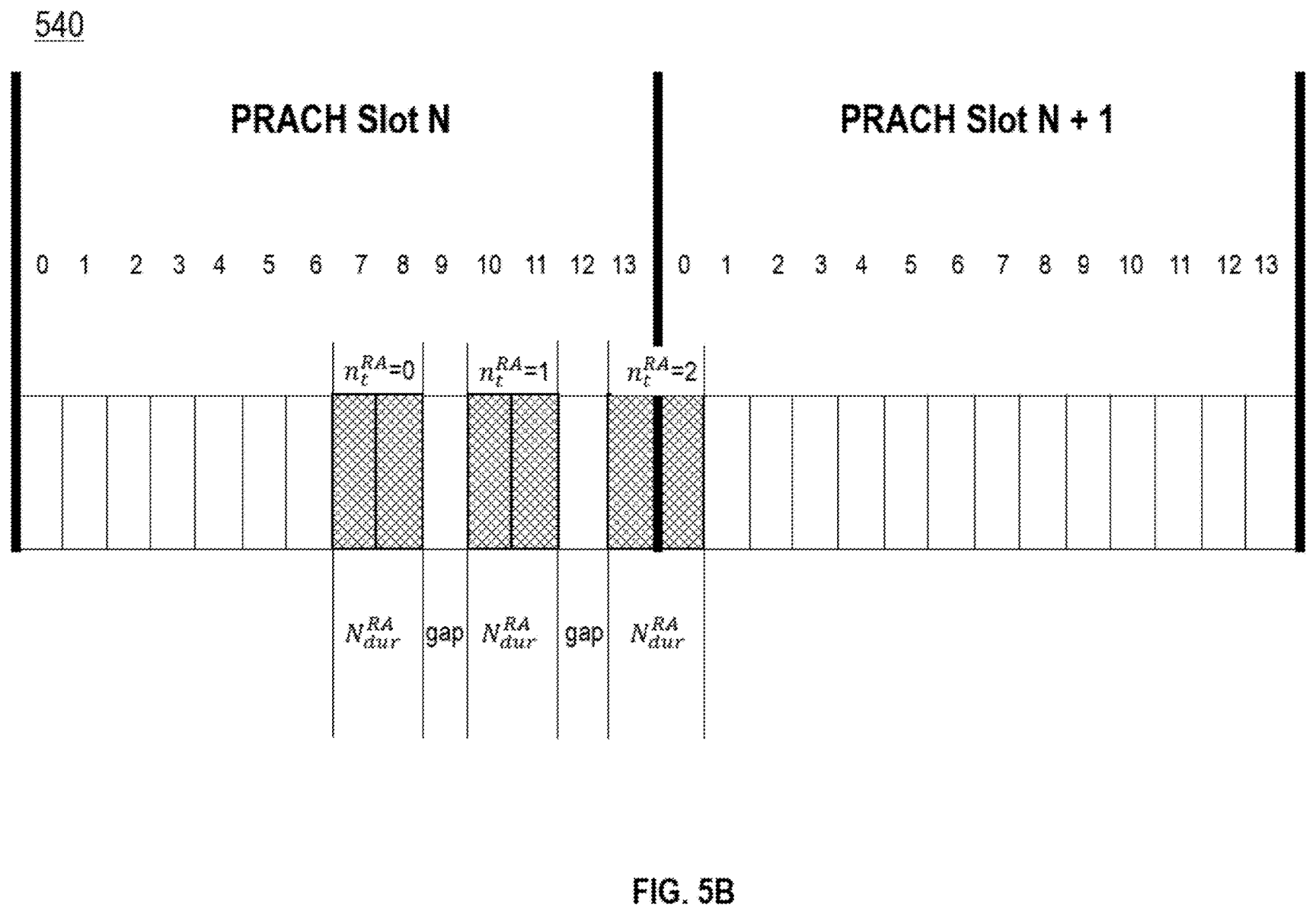
Figure 5C:
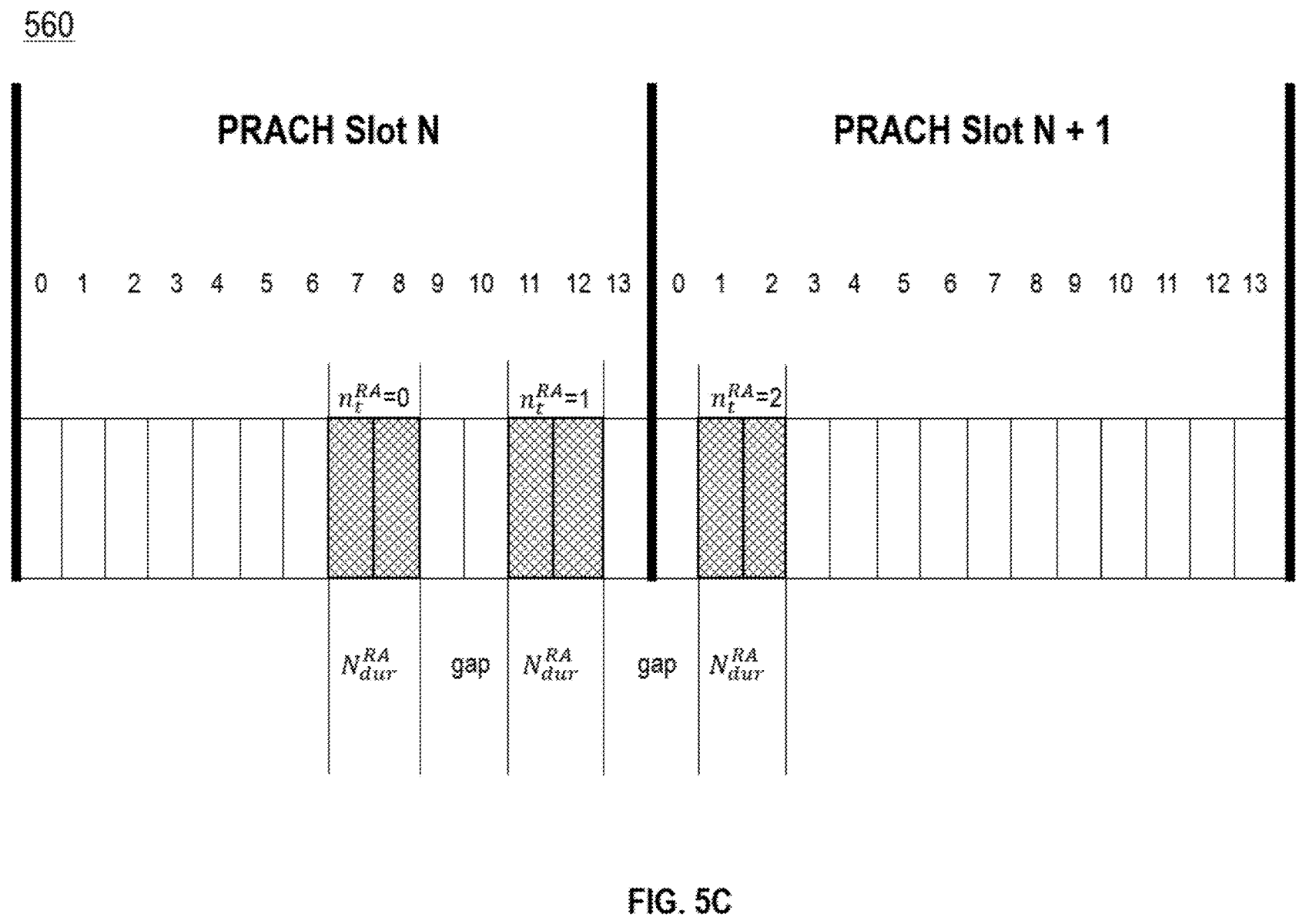

In certain embodiments, if a gap is present, introduced, and/or inserted between adjacent ROs, a time duration of a slot may be unable to include one or more ROs of said slot (e.g., all slots cannot be allocated within the slot). Referring now to FIGS. 5A to 5D, depicted are configurations of an embodiment of one or more PRACH slots, according to a value of a PRACH Config. Index. For instance, FIG. 5A illustrates an example PRACH slot, according to a PRACH Config. Index of 25. If a gap with a length of 1 symbol is introduced/inserted between adjacent ROs (as seen in FIG. 5B), at least one RO (e.g., the third RO) can straddle and/or extend across a slot boundary (e.g., the third RO can cross into another slot). If, instead, a gap with a length of 2 symbols is introduced/inserted between adjacent ROs (as seen in FIG. 5C), none of the ROs may straddle and/or extend across a slot boundary.

In certain embodiments, the wireless communication device may determine/configure the length of the gap such that a starting position of a RO is in a next PRACH slot. By configuring the starting position of the RO in a next PRACH slot, the wireless communication device can avoid the RO straddling across the PRACH slot and the next PRACH slot (e.g., straddling across the slot boundary). Such an implementation can be seen in FIG. 5D, where the starting position of the RO is in the next PRACH slot to avoid the third RO straddling across the PRACH slot (e.g., Slot N) and the next PRACH slot (e.g., Slot N+1). As such, the wireless communication device may determine that the length of the gap between the second RO and the third RO is 2 symbols (rather than 1 symbol, for example).

1. Calculation and Configuration of a Random Access Channel

Figure 5D:
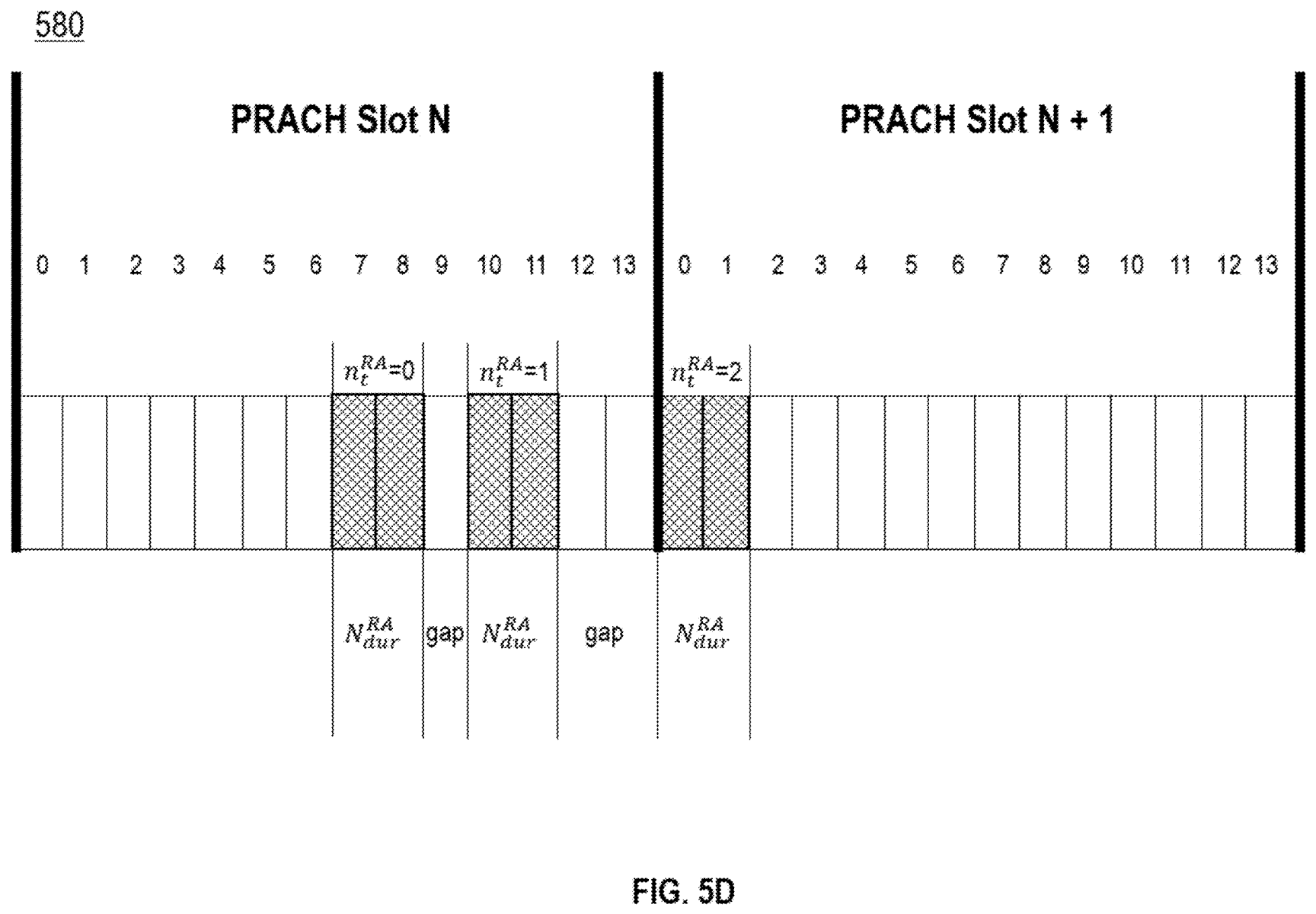
Figure 6:
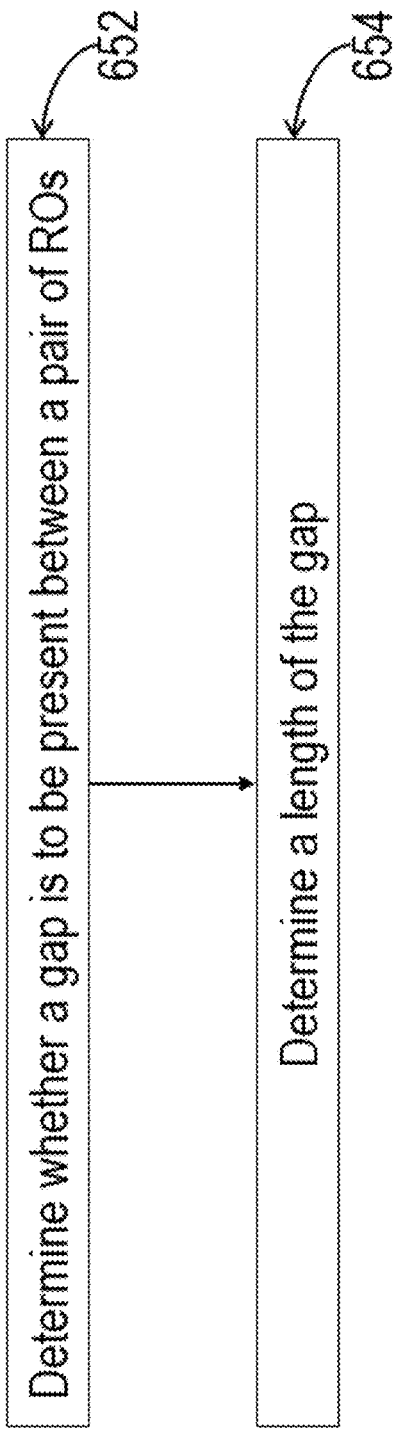
FIG. 6 illustrates a flow diagram of an example method for calculating and configuring a RACH, in accordance with an embodiment of the present disclosure.

FIG. 6 illustrates a flow diagram of a method 650 for calculating and/or configuring a random access channel. The method 650 may be implemented using any of the components and devices detailed herein in conjunction with FIGS. 1-5D. In overview, the method 650 may include determining whether a gap is to be present between a pair of ROs (652). The method 650 may include determining a length of the gap (654).

Referring now to operation (652), and in some embodiments, a wireless communication device (e.g., a UE) may determine whether a gap is to be present or absent. The gap can be present, introduced, and/or inserted between a pair of adjacent ROs. The wireless communication device (e.g., a UE) may determine whether the gap is to be present for a SCS of a PRACH slot that is higher than 120 kiloHertz (kHz) or 60 kHz. In some embodiments, the wireless communication device may determine that the gap is to be present, according to (or based on) a RO duration of a corresponding RACH format (e.g., the gap is related to (or associated with) the RACH format). In one example, the wireless communication device may determine that the gap is to be present responsive to the RO duration being smaller than, or smaller than or equal to, a threshold. The threshold may include or correspond to an "X" number of symbols, wherein "X" can be an integer with values of 4, 6, 12, and/or other values. In some embodiments, the wireless communication device may determine/identify that the gap is to be present according to a number of ROs in the PRACH slot (e.g., the gap is related to (or associated with) the number of ROs in a PRACH slot). In one example, the wireless communication device may determine that the gap is to be present responsive to the number of ROs being greater than, or greater than or equal to, a threshold. The threshold may include or correspond to a value "X", wherein "X" can be an integer with values of 2, 3, 6, 7, and/or other values. In some embodiments, the wireless communication device may determine that the gap is to be absent (e.g., not needed) according to a number of ROs in the PRACH slot (e.g., the absence of the gap is related to (or associated with) the number of ROs in a PRACH slot). In one example, the wireless communication device may determine that the gap is to be absent responsive to the number of ROs being smaller than a threshold. The threshold may include or correspond to a value "X", wherein "X" can be an integer with values of 1, 2, and/or other values.

Referring now to operation (654), and in some embodiments, the wireless communication device may determine, identify, calculate, compute, and/or configure a length of the gap, if the gap is to be present. In some embodiments, the length of the gap can be one symbol and/or a number of consecutive/adjacent symbols. In some embodiments, the wireless communication device can determine and/or configure the length of the gap according to (or based on) the SCS (e.g., SCS of 960 kHz, SCS of 480 kHz, and/or other values of a SCS). For instance, for a SCS with a value of 960 kHz, the wireless communication device may determine that the length of the gap includes or corresponds to 1 symbol, 2 symbols, 3 symbols, 4 symbols, 5 symbols, 6 symbols, 7 symbols, 8 symbols, 9 symbols, 10 symbols, 11 symbols, 12 symbols, and/or other numbers of symbols, such as M symbols. The M can indicate, include, and/or correspond to an integer value. In certain embodiments, the wireless communication device may determine the length of the gap as a value predefined for the SCS and/or mapped to the SCS. In some embodiments, the wireless communication device may determine the length of the gap according to (or based on) a frequency range (e.g., FR1, FR2, FR2-2, and/or other frequency ranges) of a PRACH preamble transmission or a system configuration. In one example, for a 480 kHz PRACH SCS (and/or other frequency ranges), the wireless communication device may determine that the length of the gap includes or corresponds to 1 symbol, 2 symbols, 3 symbols, 4 symbols, 5 symbols, 6 symbols, 7 symbols, 8 symbols, 9 symbols, 10 symbols, 11 symbols, 12 symbols, and/or other numbers of symbols, such as M symbols. The M can indicate, include, and/or correspond to an integer value. In certain embodiments, the wireless communication device may determine the length of the gap as a value predefined for the frequency range and/or mapped to the frequency range.

In some embodiments, the length of the gap can be a predefined, fixed, predetermined, and/or configured value (e.g., predefined based on a configuration of a wireless system). In some embodiments, the wireless communication device may determine the length of the gap according to an indication in a signaling. A wireless communication node can transmit, send, broadcast, and/or communicate the signaling to the wireless communication device. In some embodiments, the wireless communication device may determine the length of the gap independent of any signaling. The signaling can include DCI signaling, RRC signaling, and/or other types of signaling. The DCI signaling can correspond to a DCI 1_0 format, a DCI 0_0 format, and/or other types of DCI formats. The indication in the signaling may comprise at least one RRC parameter. The RRC parameter(s) can include at least one of: RACH-ConfigCommon, RACH-ConfigDedicated, RACH-ConfigGeneric, and/or other RRC parameters. In certain embodiments, the wireless communication device may determine/configure the length of the gap such that a starting position of a RO is in a next PRACH slot. By configuring the starting position of the RO in a next PRACH slot, the wireless communication device can avoid the RO straddling across the PRACH slot and the next PRACH slot (e.g., straddling across the slot boundary), as seen in FIG. 5D.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
determining, by a wireless communication device, whether a time gap is to be present between a pair of adjacent random access channel (RACH) occasions (ROs), in a physical RACH (PRACH) slot, for a subcarrier spacing (SCS) that is higher than 120 kilo-Hertz (KHz) or 60 KHz, wherein determining whether the time gap is to be present is based at least on a RO duration of a corresponding RACH format; and
determining, by the wireless communication device, a length of the time gap, when the time gap is to be present.

2. The method of claim 1, comprising:
determining, by the wireless communication device, that the time gap is to be present, responsive to the RO duration being smaller than, or smaller than or equal to, a threshold.

3. The method of claim 1, comprising:
determining, by the wireless communication device, that the time gap is to be present, according to a number of ROs in the PRACH slot.

4. The method of claim 3, comprising:
determining, by the wireless communication device, that the time gap is to be present, responsive to the number of ROs being greater than, or greater than or equal to, a threshold; or
determining, by the wireless communication device, that the time gap is absent, responsive to the number of ROs being smaller than the threshold.

5. The method of claim 1, wherein the length of the time gap is one symbol or a number of consecutive symbols.

6. The method of claim 1, comprising:
determining, by the wireless communication device, the length of the time gap according to the SCS.

7. The method of claim 6, comprising:
determining, by the wireless communication device, the length of the time gap as a value predefined for the SCS or mapped to the SCS.

8. The method of claim 1, comprising:
determining, by the wireless communication device, the length of the time gap according to a frequency range of a PRACH preamble transmission or a system configuration.

9. The method of claim 8, comprising:
determining, by the wireless communication device, the length of the time gap as a value predefined for the frequency range or mapped to the frequency range.

10. The method of claim 1, wherein the length of the time gap is a predefined or configured value.

11. The method of claim 1, comprising:

determining, by the wireless communication device, the length of the time gap according to an indication in a signaling, or independent of any signaling.

12. The method of claim 11, wherein the signaling comprises downlink control information (DCI) signaling or radio resource control (RRC) signaling.

13. The method of claim 12, wherein the DCI signaling corresponds to DCI 1_0 or DCI 0_0 format, or the indication comprises at least one RRC parameter including at least one of: RACH-ConfigCommon, RACH-ConfigDedicated or RACH-ConfigGeneric.

14. The method of claim 1, comprising:

determining, by the wireless communication device, the length of the time gap such that a starting position of a RO is in a next PRACH slot, to avoid the RO straddling across the PRACH slot and the next PRACH slot.

15. A method comprising:

transmitting, by a wireless communication node to a wireless communication device, a signaling;

causing the wireless communication device to determine whether a time gap is to be present between a pair of adjacent random access channel (RACH) occasions (ROs), in a physical RACH (PRACH) slot, for a subcarrier spacing (SCS) that is higher than 120 kiloHertz (KHz) or 60 KHz, wherein determining whether the time gap is to be present is based at least on a RO duration of a corresponding RACH format; and when the time gap is to be present, to determine a length of the time gap.

16. A wireless communication node, comprising:

at least one processor configured to:

transmit, via a transmitter to a wireless communication device, a signaling;

cause the wireless communication device to determine whether a time gap is to be present between a pair of adjacent random access channel (RACH) occasions (ROs), in a physical RACH (PRACH) slot, for a subcarrier spacing (SCS) that is higher than 120 kiloHertz (KHz) or 60 KHz, wherein determining whether the time gap is to be present is based at least on a RO duration of a corresponding RACH format; and when the time gap is to be present, to determine a length of the time gap.

17. A wireless communication device, comprising:

at least one processor configured to:

determine whether a time gap is to be present between a pair of adjacent random access channel (RACH) occasions (ROs), in a physical RACH (PRACH) slot, for a subcarrier spacing (SCS) that is higher than 120 kiloHertz (KHz) or 60 KHz, wherein determining whether the time gap is to be present is based at least on a RO duration of a corresponding RACH format; and determine a length of the time gap, when the time gap is to be present.

18. The wireless communication device of claim 17, wherein the at least one processor is configured to:

determine that the time gap is to be present, responsive to the RO duration being smaller than, or smaller than or equal to, a threshold.

* * * * *